(12) United States Patent
Dendas et al.

(10) Patent No.: US 11,158,960 B2
(45) Date of Patent: Oct. 26, 2021

(54) ELECTRIC WIRE CONNECTOR

(71) Applicants: TE Connectivity Nederland BV, S'Hertogenbosch (NL); Tyco Electronics Austria GmbH, Vienna (AT)

(72) Inventors: Freddy Jean Philip Dendas, Genk (BE); Olaf Leijnse, Asten (NL); Frank Rosenkranz, Vienna (AT)

(73) Assignees: TE Connectivity Nederland BV, S' Hertogenbosch (NL); Tyco Electronics Austria GmbH, Vienna (AT)

( * ) Notice: Subject to any disclaimer, the term of this patent is extended or adjusted under 35 U.S.C. 154(b) by 0 days.

(21) Appl. No.: 16/872,757

(22) Filed: May 12, 2020

(65) Prior Publication Data
US 2020/0366004 A1   Nov. 19, 2020

(30) Foreign Application Priority Data
May 15, 2019 (EP) ..................... 19174654

(51) Int. Cl.
*H01R 4/2433* (2018.01)
*H01R 11/09* (2006.01)
(52) U.S. Cl.
CPC .......... *H01R 4/2433* (2013.01); *H01R 11/09* (2013.01)

(58) Field of Classification Search
CPC .. H01R 13/506; H01R 13/5816; H01R 11/09; H01R 4/2433; Y02E 10/50
See application file for complete search history.

(56) References Cited

U.S. PATENT DOCUMENTS

| 9,912,288 | B2* | 3/2018 | Mostoller | ............... H02S 40/34 |
| 10,283,879 | B2* | 5/2019 | Dendas | ............... H01R 4/2416 |
| 2011/0287657 | A1 | 11/2011 | Lee | |
| 2015/0090492 | A1 | 4/2015 | Shi | |

FOREIGN PATENT DOCUMENTS

| EP | 631344 A2 * | 12/1994 |
| EP | 2996201 A1 | 3/2016 |

* cited by examiner

*Primary Examiner* — Briggitte R. Hammond
(74) *Attorney, Agent, or Firm* — Barley Snyder

(57) ABSTRACT

An electric wire connector connecting at least two wires includes a connector housing having a housing base and a housing cover, the housing base divided into at least two compartments, and at least two contact terminals each arranged in a different one of the at least two compartments. The at least two contact terminals are connected to one another by an electrically conductive member. The housing cover has a wire receiving opening receiving one of the at least two wires in an insertion direction. The housing cover is linearly movable relative to the housing base from an open position receiving the one of the at least two wires to a closed position terminating the one of the at least two wires.

14 Claims, 5 Drawing Sheets

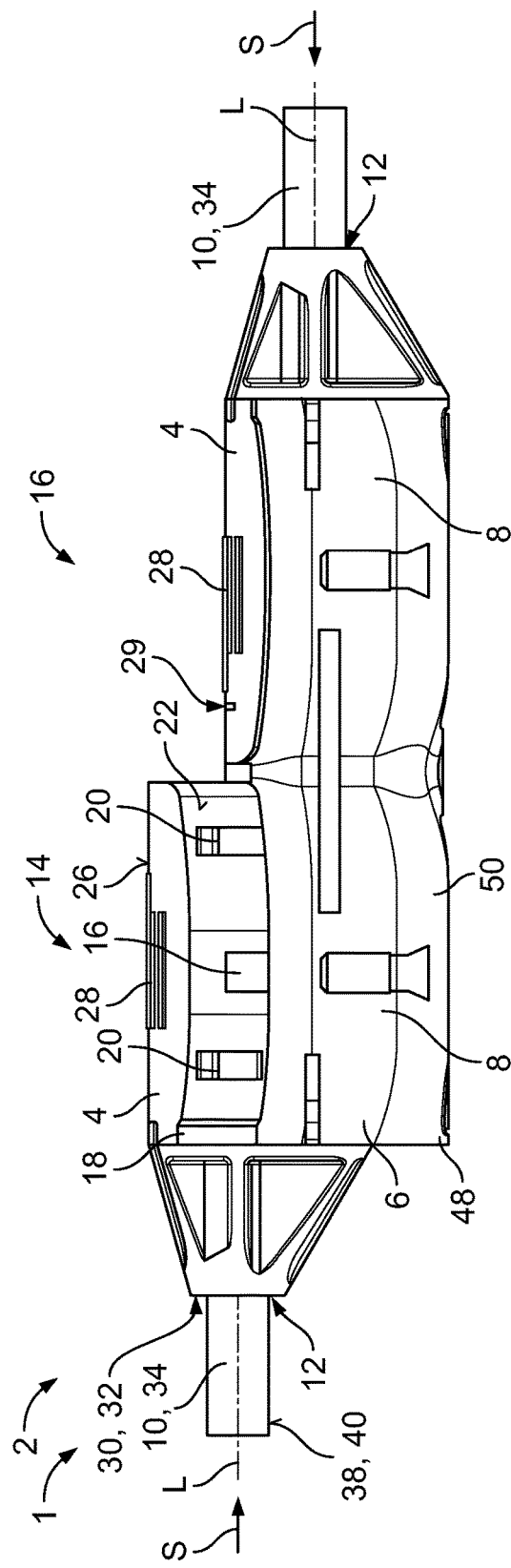
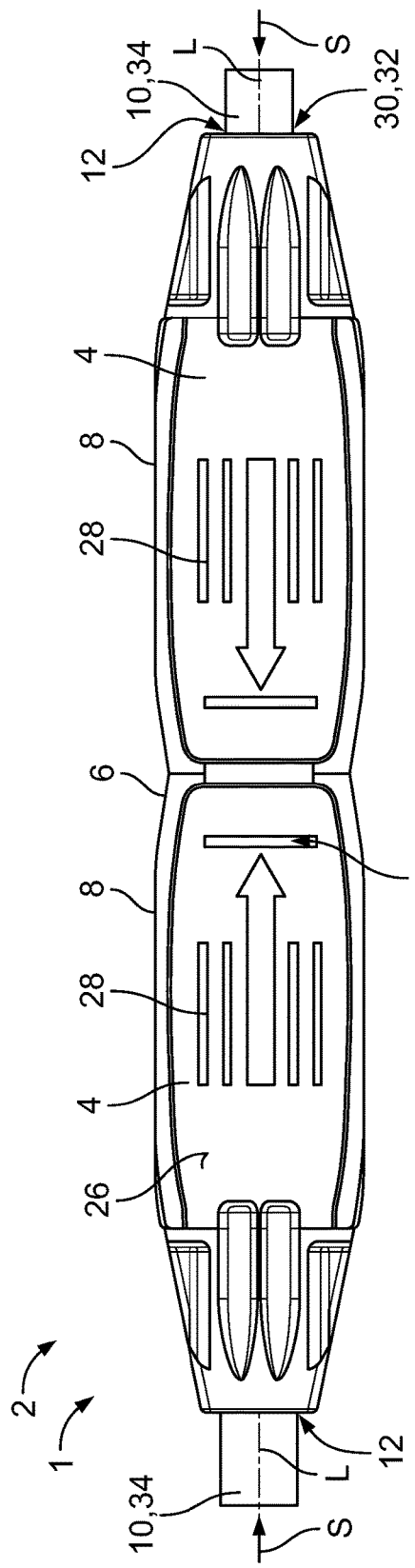

ELECTRIC WIRE CONNECTOR

CROSS-REFERENCE TO RELATED APPLICATION

This application claims the benefit of the filing date under 35 U.S.C. § 119(a)-(d) of European Patent Application No. 19174654.4, filed on May 15, 2019.

FIELD OF THE INVENTION

The present invention relates to an electric wire connector and, more particularly, to an electric wire connector for connecting at least two wires.

BACKGROUND

Electric wire connectors are used for connecting two or more wires. Usually, each wire is terminated in a separate connector, which are subsequently mated with one another. However, having different connectors for each wire may increase the size and complexity of the system. Furthermore, existing electric wire connectors are not suitable for high wire diameters. In particular, in solar systems, the solar wires have a high outer diameter ranging from 5.5 to 7.5 mm including the jacket. This makes the handling of the wires more troublesome. High bending forces are necessary, in order to terminate a wire ending in the electric wire connector.

SUMMARY

An electric wire connector connecting at least two wires includes a connector housing having a housing base and a housing cover, the housing base divided into at least two compartments, and at least two contact terminals each arranged in a different one of the at least two compartments. The at least two contact terminals are connected to one another by an electrically conductive member. The housing cover has a wire receiving opening receiving one of the at least two wires in an insertion direction. The housing cover is linearly movable relative to the housing base from an open position receiving the one of the at least two wires to a closed position terminating the one of the at least two wires.

BRIEF DESCRIPTION OF THE DRAWINGS

The invention will now be described by way of example with reference to the accompanying Figures, of which:

FIG. 1 is a side view of an electric wire connector according to an embodiment;

FIG. 2 is a top view of the electric wire connector;

DETAILED DESCRIPTION OF THE EMBODIMENT(S)

Figure 3:
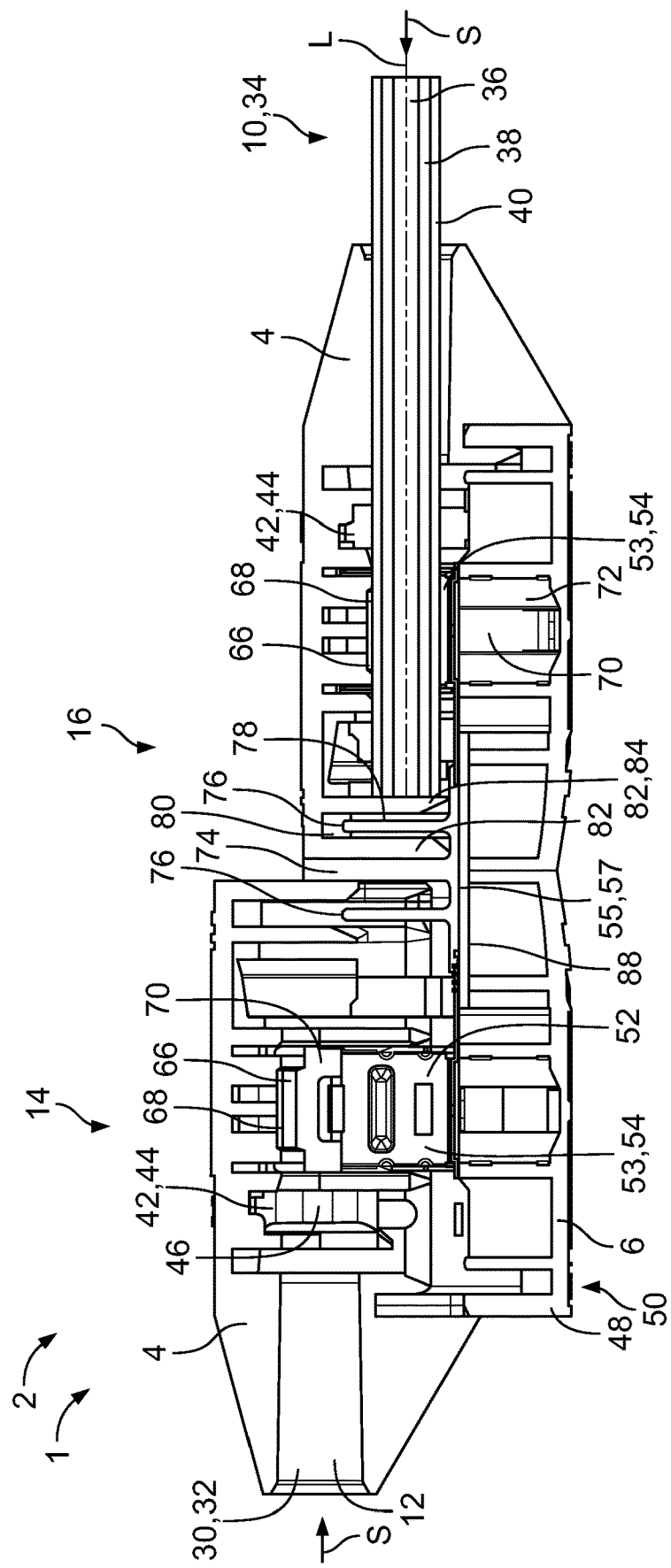
FIG. 3 is a sectional side view of the electric wire connector.

In the following, the electric wire connector according to the invention is explained in greater detail with reference to the accompanying drawings, in which exemplary embodiments are shown. In the figures, the same reference numerals are used for elements, which correspond to one another in terms of their function and/or structure. According to the description of the various aspects and embodiments, elements shown in the drawings can be omitted if the technical effects of those elements are not needed for a particular application, and vice versa: i.e. elements that are not shown or described with reference to the figures but are described above can be added if the technical effect of those particular elements is advantageous in a specific application.

An electric wire connector 1 according to an embodiment is shown in FIGS. 1-3. The electric wire connector 1, as shown in FIG. 1, comprises a connector housing 2 with at least one housing cover 4 and a housing base 6. The housing base 6 is divided into at least two compartments 8 and the at least one housing cover 4 is adapted to receive at the least one of at least two wires 10 which are to be connected to one another via the electric wire connector 1.

In the embodiment shown in FIG. 1, the connector housing 2 comprises a separate housing cover 4 for each compartment 8, which are each adapted to receive one of the at least two wires 10. The wires 10 may extend along a longitudinal axis L and can be inserted through a wire receiving opening 12 into the connector housing 2 in an insertion direction S.

The housing cover 4, as shown in FIGS. 1-3, comprises the wire receiving opening 12 and is held linearly movable relative to the housing base 6 from an open position 14 for receiving the wire 10 to a closed position 16 terminating the wire 10. The housing covers 4 are movable relative to the housing base 6 in a direction essentially perpendicular to the insertion direction. The housing covers 4 as shown in FIGS. 1-3 may be separated from one another and independently movable relative to the housing base 6. This has the advantage that during installation one can concentrate on terminating one wire 10 after the other. A user does not have to hold both wires 10 in the connector housing 2, while pushing the housing covers 4 into the closed position 16. In FIGS. 1-3, one housing cover 4 is shown in the closed position 16 and the other housing cover is shown in the open position 14.

The housing covers 4 are formed identically to one another, therefore increasing the production efficiency. The housing cover 4 may comprise a plastic material and, in an embodiment, is formed by an injection molding process. As shown in FIG. 1, the housing cover 4 may comprise a guiding slot 18 and locking latches 20 formed on an outer surface 22 facing a side surface of the housing base 6. The housing base 6 may comprise complementary formed locking latches 24, which interlock with the locking latches 20 and block further movement of the housing cover 4 relative to the housing base 6. The locking latches 20 and the complementary locking latches 24 may lock the housing cover 4 in the closed position 16, preventing any unintentional dismounting. The housing cover 4 may be adapted for single use only, meaning that once the housing cover 4 is in a closed position 16 it is locked for good, i.e. cannot be opened without exercising excessive force and/or breaking the housing cover 4. This enables a secure connection, even in harsh environments, where the connector 1 may be subject to a lot of stress such as impact or vibrations.

On a top surface 26, as shown in FIGS. 1 and 2, the housing cover 4 may comprise a ribbing 28 increasing the grip when handling the connector 1. The housing cover 4 may be moved to the closed position 16 by tools, such as pliers. The ribbing 28 may prevent slipping of the tool. The housing cover 4 has a marking 29 indicating the point in which the wire 10 is fully inserted. Alternatively, the housing cover 4 may be transparent allowing a direct view on the insertion state of the wire 10. However, the electric wire connector 1, in an embodiment, has a high impact resistance and may thus be formed comprising a plastic material with such properties, e.g. polyphenylene ether, particularly a modified polyphenylene ether. These materials are often non-transparent, therefore the marking 29 may prevent any installation errors.

Each housing cover 4 has a wire receiving opening 12, as shown in FIGS. 1 and 2, which may be formed integrally with the housing cover 4. The wire receiving opening 12 may have a circular shape and be adaptable to various wire sizes. Therefore, a single standardized housing cover 4 may be produced for different wire sizes. For example, the wire receiving opening 12 may have a maximal cross-section adapted for receiving the largest wire size. Smaller wires may thus still be insertable into the wire receiving opening 12. For example, those wire sizes may have a conductor with an effective cross section of between about 2.5 to about 10 $mm^2$ and an outer diameter of the wire, i.e. the jacket, may range between about 5.5 to about 7.5 mm.

The cross section of the at least one wire receiving opening 12 may be configured for the maximum wire size. In an embodiment, the cross section can be adapted to the wire size, i.e. if a wire with a small wire size is inserted, the cross section may be reduced to hold the wire securely in the wire receiving opening 12. This may, for example, be accomplished by providing clamping jaws in the inner surface of the wire receiving opening 12, which are held radially movable in the wire receiving opening 12, reducing or increasing the effective cross section of the wire receiving opening 12.

Various applications usually require sealed connectors 1 preventing particles, such as dust and humidity, from entering the connector housing 2. For this, at least the wire receiving opening 12 may be filled with a sealing material 30, such as a sealing gel 32. By inserting the wire 10, the sealing material 30 is penetrated leading to the wire receiving opening 12 having an effective cross section adapted to the cross section of the wire 10.

The sealing material 30 may be prearranged in the at least one wire reception opening 12 before inserting the wire 10. The sealing material 30 may be a membrane, and may include perforations or cuts separating the membrane into plural segments. The perforations or cuts do not fully penetrate the membrane but will allow a separation of the segments when inserting the wire 10 through the sealing material 30. The sealing material 30 may, in particular in the closed position 16, essentially fill the entire space within the connector housing 2. In the closed position 16, the sealing material 30 may essentially fill all voids within the housing 2 and prevent humidity or dirt from entering the housing 2. The sealing material 30 may be a gel sealing material fulfilling the requirements of an IPX8 standard, meaning that the electric connector 1 is adapted to safely being immersed under water at a certain depth for a certain time. For example, the electric connector 1 may be adapted to be submerged 1 m in water for 24 hours.

The wires 10, in the embodiment shown in FIGS. 1-3, are solar wires 34 each having a wire conductor 36 and a wire jacket 38. The wire conductor 36 may be formed by individual strands and the jacket 38 may be surrounded by a further insulation 40. Thus, the solar wire 34 may be doubly isolated.

In FIG. 3, a cut side view of the electric wire connector 1 shown in FIGS. 1 and 2 is shown. One wire 10, particularly solar wire 34, is installed in one compartment 8, meaning that the wire 10 is inserted into the wire receiving opening 12 of the respective housing cover 4 and the housing cover 4 is moved into the closed position 16. The housing cover 4 and the housing base 6 may be filled with the sealing material 30 so that all voids may be filled by the sealing material 30 in the closed position 16 and avoiding that excessive sealing material 30 is pushed out of the connector housing 2, when moving the housing cover 4 from the open position 14 to the closed position 16.

One housing cover 4 is shown in the open position 14 before insertion of the wire 10 in FIGS. 1-3. For preventing the wire 10 from slipping out of the connector housing 2 after inserting it through the wire receiving opening 12, a retention element 42 such as a retention spring 44 may be provided.

Figure 4:
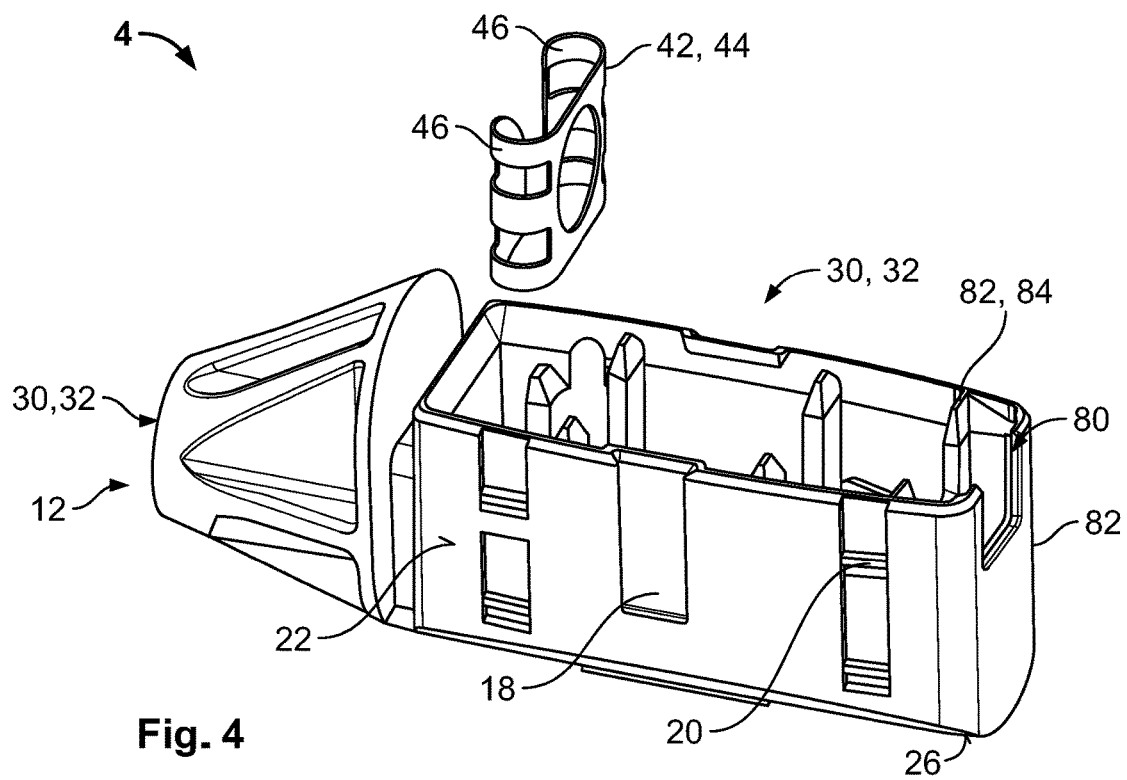
FIG. 4 is an exploded perspective view of a housing cover.
Figure 10:
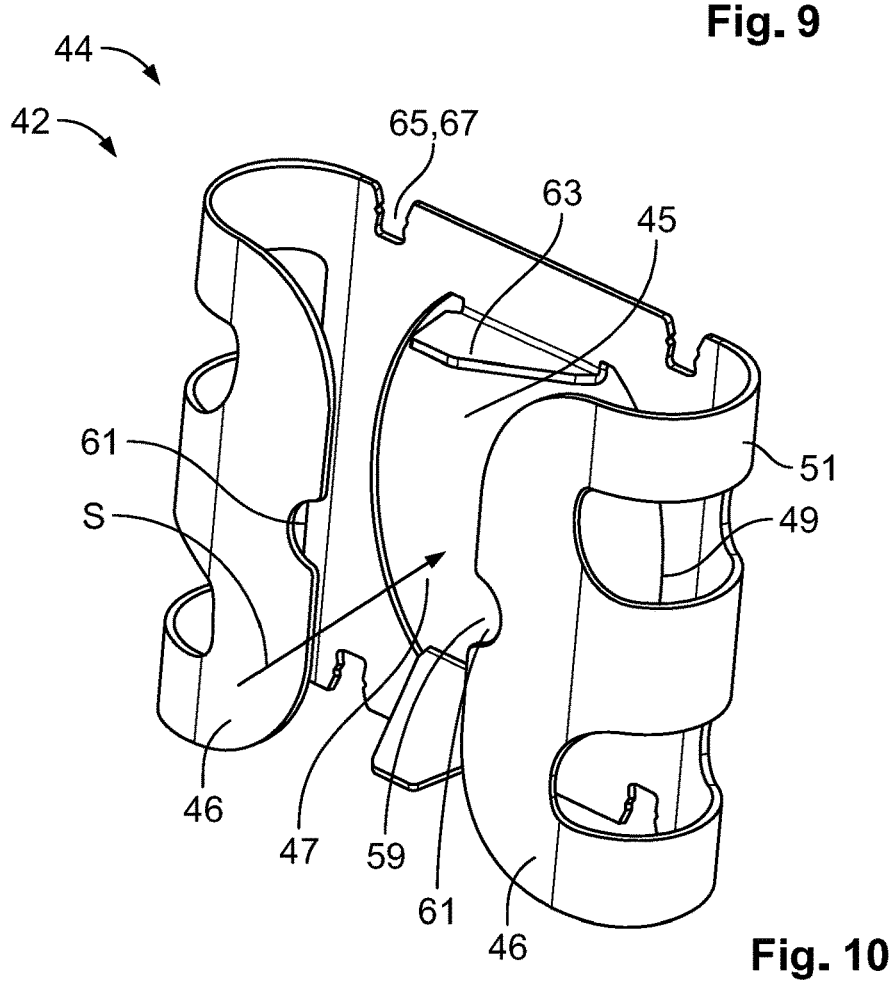
FIG. 10 is a perspective view of a retention element.

The retention element 42 is explained in further detail with reference to FIG. 4 showing an explosion view of an exemplary embodiment of a housing cover and FIG. 10 showing a schematic perspective view of the retention element 42. The retention element 42 may be mounted in the housing cover 4 and has a guiding opening 45 arranged coaxially to the wire receiving opening 12. In an embodiment, the retention element 42 may be a separate part and may be formed by a sheet metal. In this embodiment, the retention element 42 is a retention spring 44 comprising spring arms 46, which project radially inwardly and may be slightly bent obliquely to the insertion direction S to assume an inclination of 10° to 45° to the insertion direction S. Due to this inclination, the spring arms 46 define hooks cooperating with the outer circumference of the jacket 38, which hooks prevent the wire 10 from being drawn out of the housing after insertion of the wire 10. The spring arms 46 are bent towards each other and are distanced from one another by an axial slit 47. The center of the axial slit 47 is flush with the center of the guiding opening in the shown embodiment, so that the wire 10 can be inserted through the slit 47 into the guiding opening 45. The flexibility of the spring arms 46 may be further increased by providing cutouts 49 at the bending curves 51 of the spring arms.

The retention element 42 may be adapted to further absorb any torsional tension of the wire 10, so that the torsional tension is not further transmitted to contact terminals. In the embodiment shown in FIG. 10, torsion absorption features 53 are realized by a widening 59 of the axial slit 47 in a direction essentially perpendicular to the insertion direction S. Essentially circumferential recesses 61 of the spring arms 46 bordering the axial slit 47 may form the widening 59. The torsion absorption features 53 may prevent rotation of the inserted part of the wire 10 resulting in a stable wire termination.

To further ensure that the wire 10 is centered for an easy insertion, the retention element 42 may further be provided with at least one guiding flap 63 extending obliquely from the circumference of the guiding opening 45 towards the axial slit 47, as shown in FIG. 10. Thus, the guiding flap 63 may act as a ramp directing the wire 10 after passing the axial slit 47 to the guiding opening 45. At least two guiding flaps 63 may be provided in an embodiment, the at least two guiding flaps 63 being arranged diametrically to one another.

The retention element 42 may be a loose part, which can be fixedly mounted in the housing cover 4. For securely mounting the retention element 42, the retention element 42 may have locking features 65 shown in FIG. 10, such as locking notches 67, which may be pressed into a plastic rib of the housing cover 4. The retention element 42 may be further secured by the sealing material 30.

Figure 5:
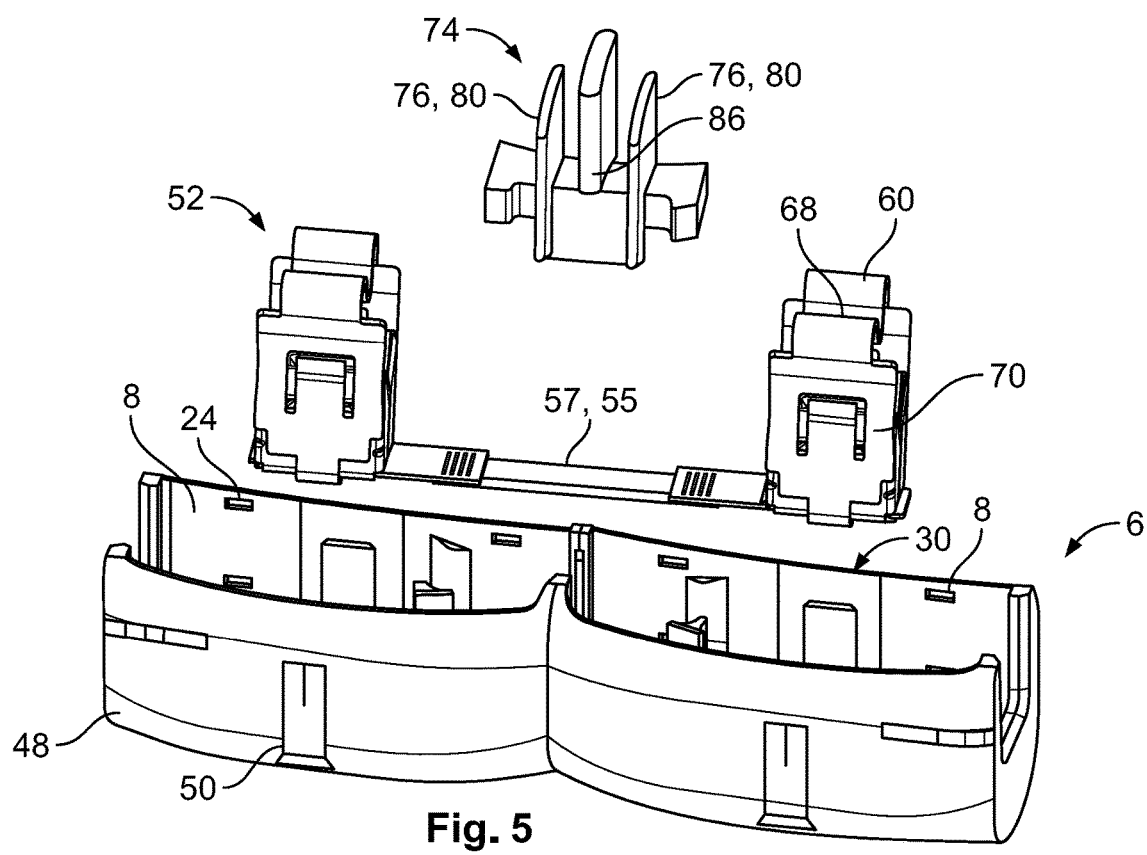
FIG. 5 is an exploded perspective view of a housing base.

FIG. 5 shows an exploded view of an exemplary embodiment of the housing base 6. The housing base 6 has an essentially U-shaped body 48, when looking at it in the insertion direction S. The body 48 may be formed as a monolithic piece 50 forming two compartments 8. The compartments 8 are symmetrical to one another in the shown embodiment, further facilitating the production process. The body 48 may be formed by an injection molding process and may be formed of a material with high impact strength.

A contact sub-assembly 52 shown in FIG. 5 may be mounted in the housing base 6. The contact sub-assembly 52 is comprised of two contact terminals 53 each adapted to be received in their respective compartments 8 and an electrically conductive member 57, in this case a copper strip 55, electrically connecting the two contact terminals 53 to one another. The contact terminals 53 may be welded onto the conductive member 57 ensuring a stable and secure connection between the two terminals 53.

Figure 6:
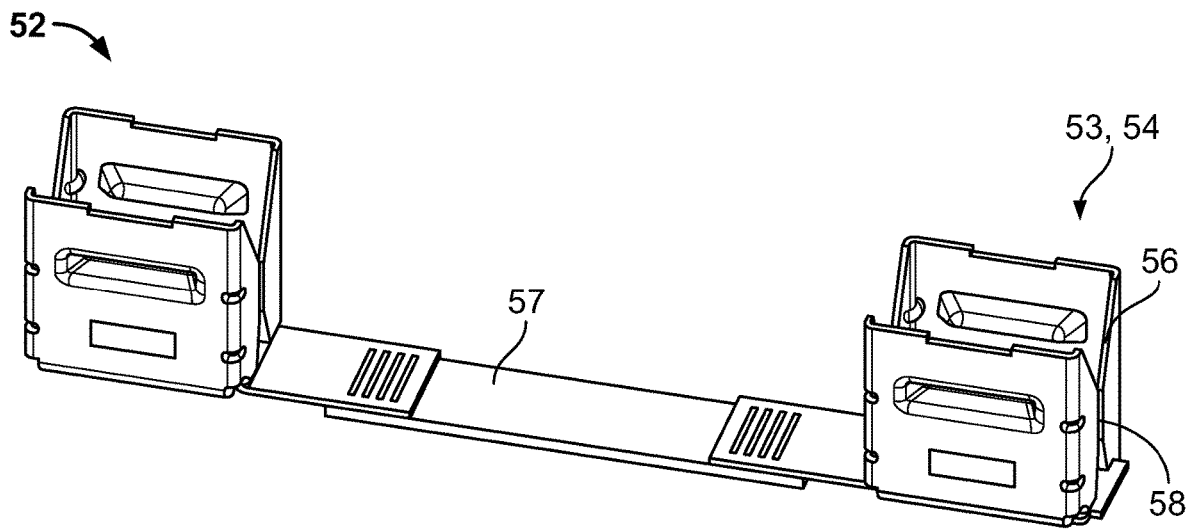
FIG. 6 is a perspective view of a connection sub-assembly according to an embodiment.
Figure 7:
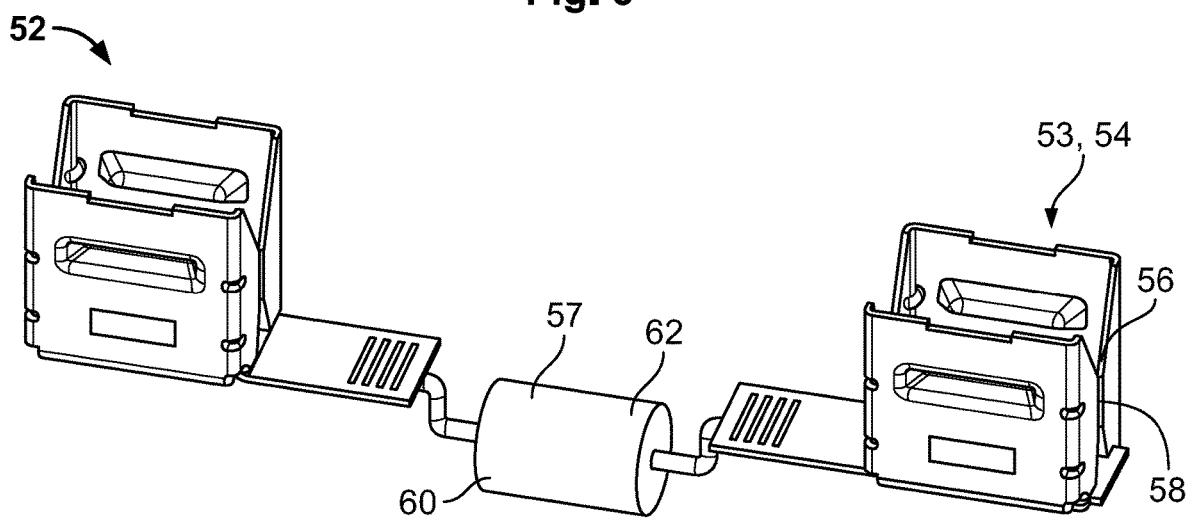
FIG. 7 is a perspective view of a connection sub-assembly according to another embodiment.
Figure 8:
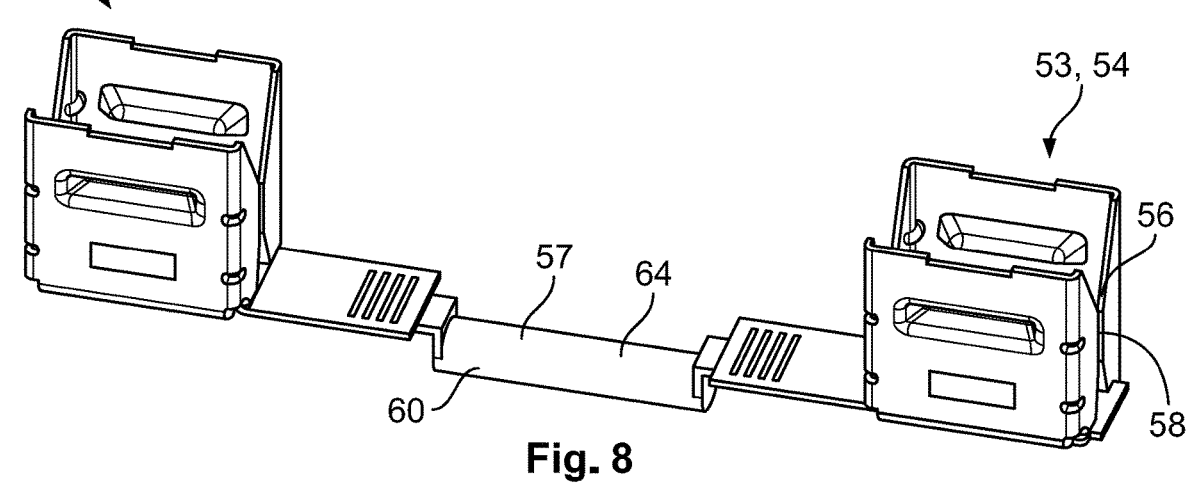
FIG. 8 is a perspective view of a connection sub-assembly according to another embodiment.

Different embodiments of the contact sub-assembly 52 are shown in FIGS. 6-8. The contact terminals 53 may be insulation displacement contacts (IDCs) 54 having a slot 56 bordered by cutting edges 58. The slot 56 may be adaptable to the wire size inserted into the slot 56. The cutting edges 58 are adapted to cut through the wire jacket 38 and contact the wire conductor 36. The IDCs 54 may each be mounted in their respective compartments 8 and be connected to one another by the conductive cooper strip 55 as shown in FIG. 5. In another embodiment, the contact terminals 53 may be insulation piercing contacts; the insulation piercing contact have spikes that penetrate through the wire jacket and contact the conductors.

The at least two contact terminals 53 may adaptable to a wide range of cable sizes. For instance, the slot 56 of the IDC 54 may be adaptable to receive different wire sizes, particularly solar wires 34 as specified above. Therefore, a standardized contact terminal may be provided, which can be used for different wire sizes instead of using specific contact terminals for each wire size. The slot 56 may particularly be arranged essentially perpendicular to the insertion direction S and parallel to the motion direction of the housing cover 4 relative to the housing base 6. Meaning that the wire 10 will be linearly inserted into the slot 56 causing a straight incision of the cutting edges into the wire jacket 38 perpendicular to the longitudinal axis of the wire 10.

In an embodiment, the conductive member 57 may further comprise at least one securing feature 60. The securing feature 60 may be a diode 62 or a fuse 64 as shown in FIGS. 7 and 8, respectively. The securing feature 60 may thus replace a securing feature placed in a different place in the application system. Hence, by introducing the securing feature 60 into the electrical wire connector 1, the application system's components may be further decreased, as well as the number of interconnects. This would lead to a higher reliability and increased user experience.

As shown in FIG. 3, a biasing spring 66 may be provided. The biasing spring 66 may encompass the IDC 54 and be slidably movable relative to the IDC 54. The movement of the biasing spring 66 may be actuated by movement of the housing cover 4. Thus, the housing cover 4 may push the biasing spring 66 towards the IDC 54 in the closed position.

The biasing spring 66 does not need to be mounted in the housing cover 4. Alternatively or additionally, the housing base 6 may encase the IDC 54 and be adapted to slide relative to the IDC 54 when being pushed down by the housing cover 4. The biasing spring 66 may comprise spring tongues adapted to engage complementary-formed notches at least in the closed position to further stabilize the relative position between the IDC 54 and the biasing spring 66 in the closed position 16.

The biasing spring 66 may have an essentially U-shape and be arranged in the housing cover 4 in the open position 14 as seen in FIG. 3. Thus, when inserting the wire 10 into the housing cover 4, the wire 10 is eventually encompassed by the biasing spring 66. The biasing spring 66 may be attached to the housing cover 4 by an adhesive and/or a form-fit. When pushing the housing cover 4 into the closed position 16, the biasing spring is moved synchronously with the housing cover 4. Thus, a crossbeam 68 of the biasing spring 66 presses the wire 10 in the motion direction and at least in the closed position 16 pushes the wire 10 into the slot 56 and holds it in the slot 56 with a biasing force. The biasing spring 66 may comprise arms 70 connected by the crossbeam 68, which slide past the IDC 54 and may be received in a receiving chamber 72 formed in the body 48 of the housing base 6.

The biasing spring 66 may reinforce the contact between the wire conductor 36 and the IDC 54 making the connector 1 suitable for high current connections. With increased contact force, it is also possible to arrange the strands of the wire conductor 36 more tightly. This would lead to a sound pressing force of the conductor 36 against opposing side surfaces of the IDC 54 and a thorough contact of each of the strands against each other within the contact slot on the other hand.

As shown in FIG. 5, a barrier 74 may be provided, physically separating the two compartments 8. The barrier 74 and the housing base 6 may be separate parts, and the barrier 74 may be fixedly attached in the housing base 6 after mounting of the contact sub-assembly 52. In another embodiment, the barrier 74 and the housing base 6 may be formed as a single monolithic piece, for example by injection molding.

Figure 9:
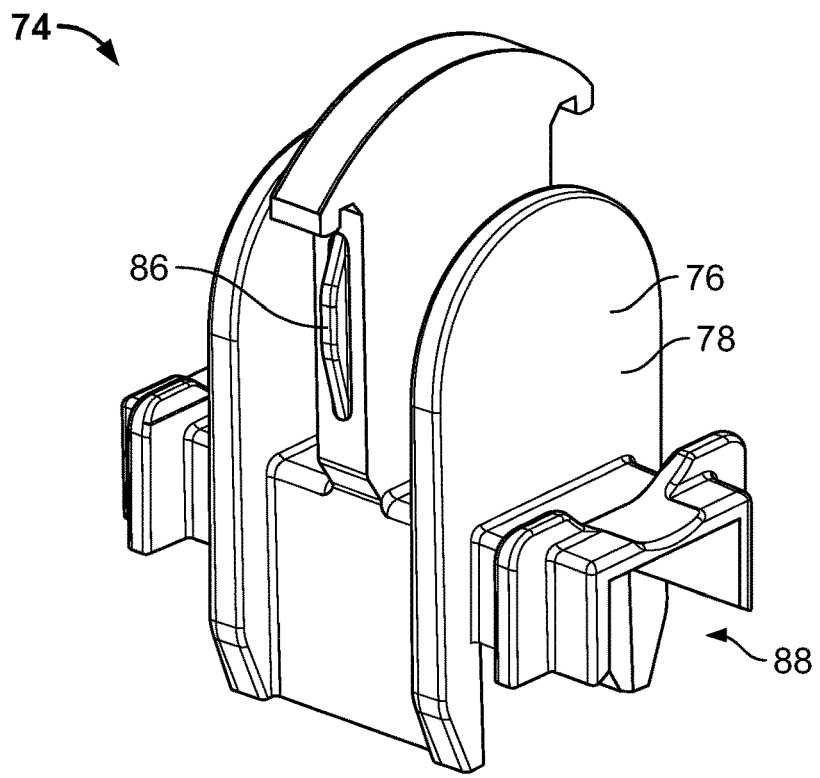
FIG. 9 is a perspective view of a barrier.

FIG. 9 shows an embodiment of the barrier 74. The barrier 74 may comprise a pair of securing ribs 76 arranged opposite to one another, each forming an end wall 78 of the respective compartment 8 in the insertion direction S at least in the open position 14. In the closed position 16, the securing ribs 76 may be arranged to extend into a slot 80 formed between the ribs 82 of the housing cover 4, as shown in FIG. 5. The ribs 82 may be distanced from one another in the insertion direction S, wherein the rib 82 that is arranged closer to the respective wire receiving opening 12 in the insertion direction S may form a stop point 84, as shown in FIG. 3, up to which the wire 10 may be inserted into the connector housing 2. The slot 80 may be filled with the sealing material 30, further securing the position of the at least one housing cover 4 and housing base 6 in the insertion direction S and stabilizing the ribs 82. This allows for a greater distance between the ribs 82 of each compartment and may thus further help ensuring that creep and/or clearance requirements are met.

The barrier 74 may be formed from the same material as the housing base 6. To securely mount the barrier 74, the barrier 74 and the housing base 6 are provided with a clicking mechanism 86, as shown in FIGS. 5 and 9. In order to allow an easy passage of the conductive member 57 between both compartments 8, a channel 88 may be provided. The channel 88 may be formed between the barrier 74 and the housing base 6 and encompass the conductive member 57. To further stabilize the mounted barrier 74, the sealing material 30 may be provided by filling the channel 88 and the compartments 8.

With the inventive electric wire connector 1, a single connector is provided for connecting the at least two wires 10 to one another. The simple structure and compactness of the electric wire connector 1 simplifies the whole application system. Less different parts are needed to connect the at least two wires 10 to one another, further increasing the production efficiency of the connection system.

Furthermore, the at least one reception opening 12 is arranged in the housing cover 4, the housing cover 4 being linearly movable relative to the housing base 6. Therefore, the whole wire 10, meaning the part that is inserted through the reception opening 12 into the connector housing 2 and the part of the wire 10 located directly in front of the reception opening 12 outside of the connector housing 2, can be moved towards the housing base 6 and the contact terminal 53 arranged in the housing base 6. Consequently, high bending forces can be prevented for terminating the wire 10.

The electric connector 1, in an embodiment, may be used for a solar installation with a first and second solar wire 34, wherein both solar cables are each received in the electric wire connector 1. The solar wires 34 may have the same wire size or have different wire sizes. Each solar wire 34 may be received in a respective compartment 8 and may be inserted along their longitudinal axis in the insertion direction S into the at least one housing cover 4 in the open state. In other words, the longitudinal axis of the solar wire 34 may be arranged essentially parallel to the insertion direction S. According to a further embodiment, the longitudinal axis of the solar wire 34 in the closed position 16 may be arranged essentially parallel to the longitudinal axis of the solar wire 34 in the open position 14.

What is claimed is:

1. An electric wire connector connecting at least two wires, comprising:
   a connector housing having a housing base and a housing cover, the housing base divided into at least two compartments, the housing cover has a wire receiving opening receiving one of the at least two wires in an insertion direction, the housing cover is linearly movable relative to the housing base from an open position receiving the one of the at least two wires to a closed position terminating the one of the at least two wires;
   at least two contact terminals each arranged in a different one of the at least two compartments, the at least two contact terminals are connected to one another by an electrically conductive member; and
   a barrier separating the at least two compartments from one another, the barrier has a channel receiving the electrically conductive member.

2. The electric wire connector of claim 1, wherein the wire receiving opening is filled with a sealing material.

3. The electric wire connector of claim 1, wherein the connector housing has a separate housing cover for each of the at least two compartments.

4. The electric wire connector of claim 3, wherein each housing cover is movable independently from one another.

5. The electric wire connector of claim 1, wherein the housing cover is movable relative to the housing base in a direction perpendicular to the insertion direction.

6. The electric wire connector of claim 1, further comprising a retention element mounted in the housing cover.

7. The electric wire connector of claim 6, further comprising a biasing spring pushing the one of the at least two wires against one of the at least two contact terminals.

8. The electric wire connector of claim 7, wherein the retention element is arranged between the biasing spring and the wire receiving opening.

9. The electric wire connector of claim 1, wherein the at least two contact terminals are each an insulation displacement contact with a pair of cutting edges that terminate into a slot receiving the one of the at least two wires.

10. The electric wire connector of claim 1, wherein the barrier and the housing base and/or the housing cover are separate parts.

11. The electric wire connector of claim 1, wherein the electrically conductive member has a securing feature.

12. The electric wire connector of claim 11, wherein the securing feature is a diode or a fuse.

13. A solar installation, comprising:
   a first solar wire;
   a second solar wire; and
   an electric wire connector receiving and connecting the first solar wire and the second solar wire, the electric wire connector including a connector housing having a housing base and a housing cover, the housing base divided into at least two compartments, at least two contact terminals each arranged in a different one of the at least two compartments, the at least two contact terminals are connected to one another by an electrically conductive member, and a barrier separating the at least two compartments from one another, the barrier has a channel receiving the electrically conductive member, the housing cover has a wire receiving opening receiving one of the first solar wire and the second solar wire in an insertion direction, the housing cover is linearly movable relative to the housing base from an open position receiving the one of the first solar wire and the second solar wire to a closed position terminating the one of the first solar wire and the second solar wire.

14. An electric wire connector connecting at least two wires, comprising:
   a connector housing having a housing base and a housing cover, the housing base divided into at least two compartments, the housing cover has a wire receiving opening receiving one of the at least two wires in an insertion direction, the housing cover is linearly movable relative to the housing base from an open position receiving the one of the at least two wires to a closed position terminating the one of the at least two wires;
   at least two contact terminals each arranged in a different one of the at least two compartments, the at least two contact terminals are connected to one another by an electrically conductive member;
   a biasing spring pushing the one of the at least two wires against one of the at least two contact terminals; and
   a retention element mounted in the housing cover, the retention element is arranged between the biasing spring and the wire receiving opening.

* * * * *